(12) United States Patent
Arrenberg

(10) Patent No.: US 9,150,133 B2
(45) Date of Patent: Oct. 6, 2015

(54) SEAT CUSHION INCLINATION ADJUSTMENT SYSTEM

(75) Inventor: Jurgen Arrenberg, Wuppertal (DE)

(73) Assignee: Johnson Controls GmbH (DE)

( * ) Notice: Subject to any disclaimer, the term of this patent is extended or adjusted under 35 U.S.C. 154(b) by 350 days.

(21) Appl. No.: 13/394,570

(22) PCT Filed: Sep. 22, 2010

(86) PCT No.: PCT/EP2010/005791
§ 371 (c)(1),
(2), (4) Date: Mar. 7, 2012

(87) PCT Pub. No.: WO2011/054416
PCT Pub. Date: May 12, 2011

(65) Prior Publication Data
US 2012/0169100 A1    Jul. 5, 2012

(30) Foreign Application Priority Data
Nov. 5, 2009  (DE) .................. 10 2009 052 111

(51) Int. Cl.
*B60N 2/62* (2006.01)
(52) U.S. Cl.
CPC ........................ *B60N 2/62* (2013.01)
(58) Field of Classification Search
CPC ....................................................... B60N 2/62
USPC ................. 297/284.7, 284.8, 284.11, 353
See application file for complete search history.

(56) References Cited

U.S. PATENT DOCUMENTS

| 945,449 | A | | 1/1910 | Edgcombe |
| 3,554,599 | A | * | 1/1971 | Pietschmann ................. 297/353 |
| 4,153,294 | A | * | 5/1979 | Meiller et al. ........... 297/284.11 |
| 4,334,709 | A | | 6/1982 | Akiyama et al. |
| 5,797,574 | A | | 8/1998 | Brooks et al. |
| 6,419,317 | B1 | * | 7/2002 | Westrich et al. ......... 297/284.11 |
| 6,601,918 | B2 | * | 8/2003 | Mattsson ................. 297/284.11 |
| 6,926,361 | B2 | * | 8/2005 | Link ............................. 297/337 |
| 7,104,609 | B2 | * | 9/2006 | Kim ......................... 297/411.35 |
| 7,108,322 | B2 | * | 9/2006 | Erker ....................... 297/284.11 |
| 7,513,569 | B2 | | 4/2009 | Curiger |
| 7,669,928 | B2 | * | 3/2010 | Snyder ..................... 297/284.11 |
| 7,909,401 | B2 | * | 3/2011 | Hofmann et al. ........ 297/284.11 |
| 8,272,687 | B2 | * | 9/2012 | Gross et al. ................ 297/216.1 |
| 2002/0021036 | A1 | * | 2/2002 | Jonas et al. ............. 297/284.11 |
| 2005/0044974 | A1 | | 3/2005 | Wagner |

FOREIGN PATENT DOCUMENTS

| CN | 2648919 | 10/2004 |
| CN | 101456369 | 6/2009 |
| DE | 4423957 A1 | 7/1994 |

(Continued)

OTHER PUBLICATIONS

European Examination Report dated Feb. 6, 2014; Application No. 10768396.3.

(Continued)

*Primary Examiner* — Peter Brown
(74) *Attorney, Agent, or Firm* — The Dobrusin Law Firm, P.C.

(57) ABSTRACT

The invention relates to a seat part of a motor vehicle seat, comprising a base part having a transverse supporting element and an adjustable part.

7 Claims, 2 Drawing Sheets

(56) References Cited

FOREIGN PATENT DOCUMENTS

| | | | |
|---|---|---|---|
| DE | 19512012 A1 | 3/1995 | |
| DE | 4423957 A1 | 1/1996 | |
| DE | 19512012 A1 | 10/1996 | |
| DE | 202006001969 U1 | 2/2006 | |
| DE | 102006050614 A1 | 5/2007 | |
| DE | 202006001969 U1 | 6/2007 | |
| DE | 202006001969 U1 | 7/2007 | |
| DE | 102008046000 A1 | 6/2009 | |
| EP | 0882619 A2 | 9/1998 | |
| EP | 0882619 A2 | 12/1998 | |
| EP | 2006149 A2 | 12/2008 | |
| EP | 2085262 A1 | 8/2009 | |
| GB | 2166648 A | 8/1985 | |
| JP | 06-038852 A | 2/1994 | |
| JP | 07-27054 A | 10/1995 | |
| JP | 2004-217011 A | 8/2004 | |
| JP | 2008-105520 A | 5/2008 | |

OTHER PUBLICATIONS

1st Chinese Office Action for Appln. No. 201080048829.9; Dated Oct. 10, 2013.

Japanese Office Action dated Aug. 27, 2013 for Appln. No. 2012-535645.

International Preliminary Report on Patentability dated May 18, 2012; Appln. No. PCT/EP2010/005791.

Written Opinion of the International Searching Authority; Appln. No. PCT/EP2010/005791.

* cited by examiner

SEAT CUSHION INCLINATION ADJUSTMENT SYSTEM

CLAIM OF PRIORITY

This application claims priority from German application serial, number 10 2009 052111.9 filed 5 Nov. 2009, and is a national application based on PCT Application International Application PCT/EP2010/005791, filed 22 Sep. 2010 (published as WO2011/054116) and claims the benefit of the filing date of 22 Sep. 2010, all incorporated herein by reference.

The present invention relates to a seat part of a motor vehicle seat, comprising a base part having a transverse supporting element and an adjustable part.

Such seat parts are known from the prior art and are used, for example, for optimally adapting the upper leg support of the seat occupant to the physiognomy thereof. The adjustable part is in this case arranged on the front end, of the seat part and is provided to be rotatable, pivotable and/or movable in a translatory manner. The seat adjusters known from the prior art, however, are of relatively complex construction and therefore, both relatively expensive and relatively heavy-duty.

It was the object of the present invention, therefore, to provide a seat part which does not have the drawbacks of the prior art.

The object is achieved by a seat part of a motor vehicle seat comprising a base part having a transverse supporting element and an adjustable part, wherein the seat load, as well as the force when adjusting said part, are always oriented centrally relative to the transverse supporting element.

The present invention relates to the seat part of a motor vehicle seat, which consists of said seat part and a backrest. The backrest is generally provided to be rotatable on the seat part so that the angle of inclination between the seat part and the backrest may be adjusted. The motor vehicle seat may provide space for one or more people. As a result, the motor vehicle seat may also be seat bench.

The seat part according to the invention is preferably provided in a longitudinally displaceable manner in the motor vehicle and particularly preferably in a height-adjustable manner in order to be able to adjust the motor vehicle seat in an optimal manner to the respective physiognomy of the seat occupant.

According to the invention, the seat part comprises a base part which has a transverse supporting element. Said transverse supporting element is preferably part of the frame and/or part of the height adjustment mechanism of the seat. Moreover, the seat part according to the invention comprises an adjustable part. Said adjustable part is particularly preferably arranged in the upper leg region of the seat occupant and particularly preferably may be moved or pivoted relative to the base part in a rotational and/or translatory manner, in order to be optimally adapted to the physiognomy of the respective occupant.

According to the invention, it is thus provided that when the seat is loaded and when adjusting the adjustable part, the force is always oriented centrally relative to the transverse supporting element. As a result, it is ensured that no support moments have to be absorbed, in particular by the transverse supporting element.

According to a further subject according to the invention or a preferred subject of the present invention, said invention comprises an adjustment mechanism, in particular a drive, which in each position of the adjustable part is relatively loaded exclusively by compressive and tensile force by the base part.

Said embodiment according to the invention or preferred embodiment of the present invention comprising a corresponding kinematic system has the advantage that the adjustment mechanism does not have a dead center point.

Preferably, the adjustment is carried out by means of linear drive. Particularly preferably, said linear drive is a nut-spindle drive, wherein the nut or the spindle may be driven in a rotational manner and then the nut is moved relative to the fixed spindle or the spindle relative to the fixed nut.

The linear drive is further preferably a piston-cylinder arrangement with force support, for example a lockable gas pressure spring.

The linear drive may also be, for example, a motorized drive.

Preferably, the linear drive is rotatably mounted on the heavy-duty support.

Further preferably, the seat part comprises a height adjustment mechanism, wherein particularly preferably the transverse supporting element is part of the height adjustment mechanism.

Preferably the adjustment drive, in particular the linear drive, is arranged in the center of the seat relative to the Z-direction, i.e. in the direction of travel of the vehicle.

According to a further embodiment, the seat part comprises an energy accumulator which assists the adjustment of the adjustable part, in particular against gravitational force. Such an energy accumulator may be, for example, a spring.

The inventions are explained hereinafter with reference to FIGS. 1 to 5. Said explanations apply equally to all subjects of the present invention. The explanations do not limit the general idea of the invention.

Figure 1:
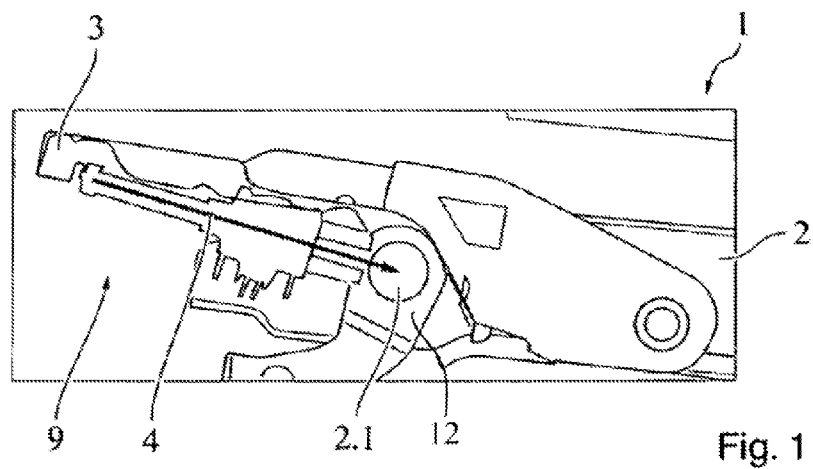
FIG. 1 shows the support of the adjustable part on the transverse supporting element.

In FIG. 1 the seat part 1 is shown, said seat part comprising a base part 2 and an adjustable part 3 provided in a rotatable and/or longitudinally displaceable manner thereon. The adjustable part 3 is arranged in the front region of the seat part remote from the backrest and serves for supporting the upper legs of the beat occupant and may be adjusted to the respective physiognomy of the seat occupant. According to the invention it is thus provided that the force which occurs when adjusting the part 3 is always centrally oriented relative the transverse supporting element. Within the meaning of the present invention, "centrally" means that the force is oriented toward the geometric center point and/or to the geometric center axis, which in the present case is shown by the arrow 4. As a result, no torques have to be absorbed by the structure, in particular by the transverse supporting element 2.1. The transverse supporting element 2.1 in the present case is part of the height adjustment mechanism 12. Said preferred embodiment of the present invention has the advantage that the same parts may be used both for the height adjustment and for the adjustment of the thigh support. The further subject of the present invention may also be derived from FIG. 1, namely that in each position of the part 3 relative to the base part 2 only compressive forces and/or tensile forces act on the adjustment mechanism, in particular the drive, in this case the linear drive 9. According to the kinematic system shown in FIG. 1, the seat part 3 is mounted in a rotatable and/or longitudinally displaceable manner at point 5 on the frame 2. As a result, it is ensured that the seat part according to the invention does not have a dead center point. The drive of the adjustment mechanism is provided to be rotatable but also longitudinally fixed with one end thereof on the transverse supporting element 2.1. The other end is provided in a rotatable and/or longitudinally displaceable manner on the adjustable part 3.

Figure 2:
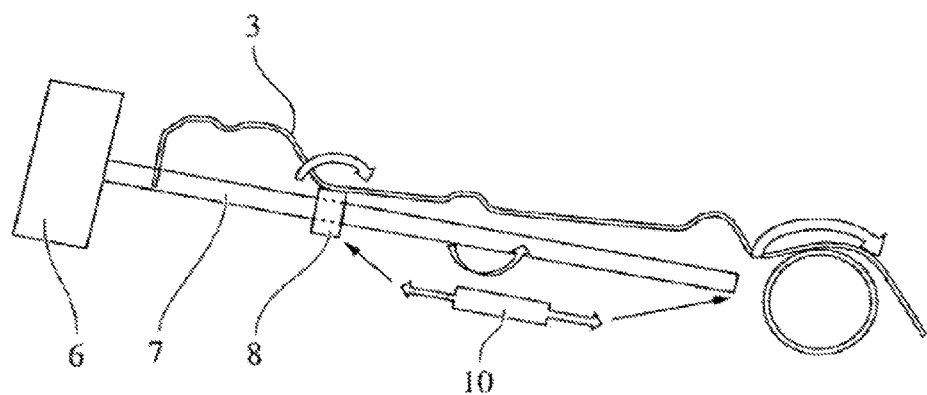
FIG. 2 shows the drive of the adjustment mechanism provided as a spindle-nut arrangement as well as a cylinder piston arrangement.

FIG. 2 shows a preferred embodiment of the drive of the adjustment. In the present case, the drive is a linear drive and comprises a spindle 7 on which a nut 8 is arranged which is fixedly connected, in particular fixedly in terms of rotation, to the adjustable part. By means of the handle 6, the spindle is provided to be rotatable, wherein during the rotation thereof the nut 8 is adjusted along the longitudinal axis of the spindle 7. The nut 8 is provided on the adjustable part 3, so that when adjusting the nut 8 the adjustable part 3 is also moved about the point 5. The spindle end in the present case is rotatably fastened in an abutment (not shown) centrally on the tube end. The spindle end is mounted in the abutment in a pressure-resistant and tension-resistant manner. The person skilled in the art understands that it is also possible to rotate the nut and to displace the entire spindle or the nut axially on the spindle. Moreover, the person skilled in the art understands that the manual drive together with the handle may also be replaced by a motorized drive. A further alternative of the linear drive is shown in FIG. 2. As may be derived from FIG. 2, the linear drive may be a piston cylinder arrangement 10.

Figure 3:
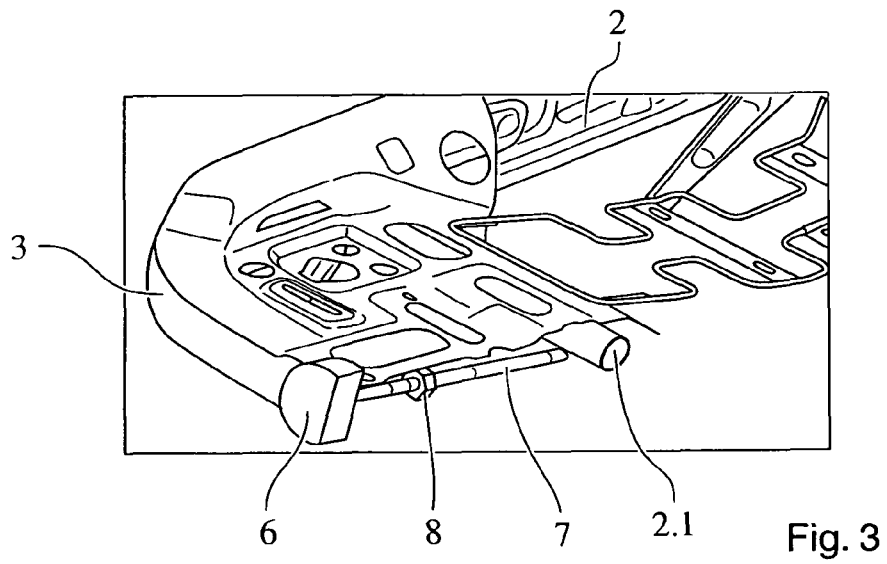
FIG. 3 shows once again the spindle-nut drive.
Figure 4:
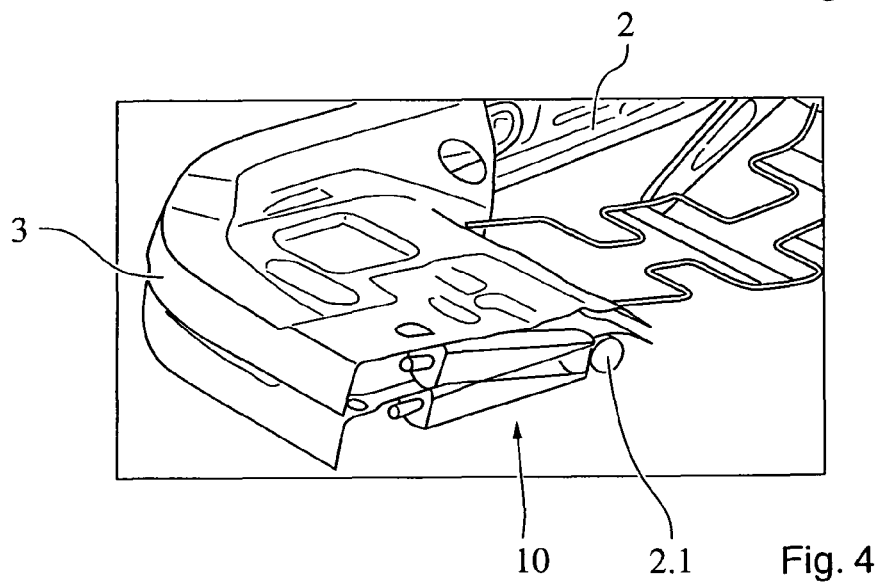
FIG. 4 shows the embodiment according to FIGS. 1 to 3, but with a piston cylinder arrangement.
Figure 5:
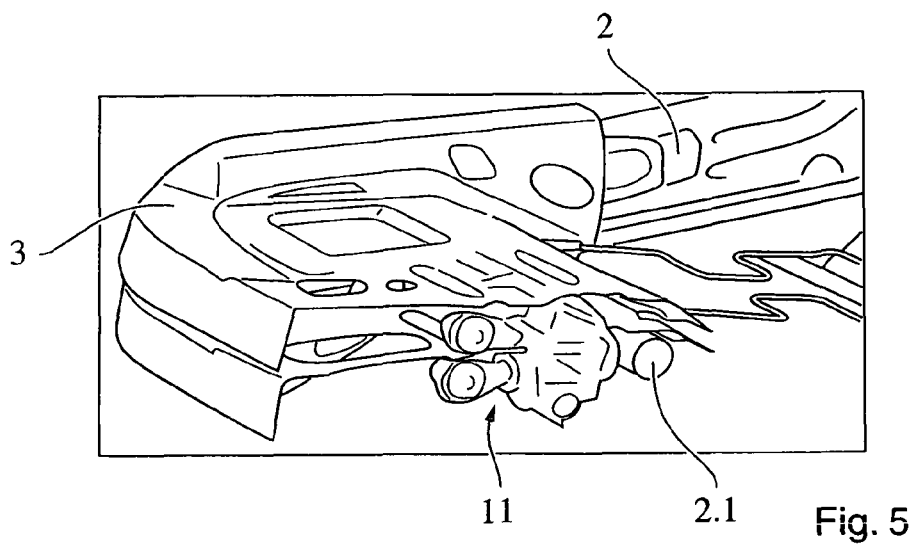
FIG. 5 shows the embodiment according to FIGS. 1 to 3, but with a motorized drive.

Three alternative embodiments of the linear drive are shown in FIGS. 3 to 5.

FIG. 3 shows once again the spindle nut arrangement.

FIG. 4 shows the drive of the adjustable part by means of a piston cylinder arrangement.

FIG. 5 shows a motorized drive of the adjustable part.

It is common to all embodiments of the drives that they act in each case centrally on the transverse tube 2.1. Moreover, it is common to all these embodiments that the resulting forces acting on the tube 2.1 in each case are compressive forces and/or tensile forces and that in every position of the adjustable part the drive is loaded by compressive and/or tensile force.

LIST OF REFERENCE NUMERALS

1 Seat part
2 Base part of the seat part
2.1 Transverse supporting element, transverse tube
3 Adjustable part of the seat part
4 Direction of force
5 Rotational point
6 Handle
7 Spindle
8 Nut
9 Linear drive
10 Piston/cylinder arrangement
11 Motorized drive
12 Height adjustment mechanism

The invention claimed is:

1. A seat part of a motor vehicle seat, comprising:
a base part comprising a height adjustment mechanism which includes a transverse supporting element;
an adjustable part, the position of which is adjusted relative to the base part; and
a seat depth adjustment mechanism, displaced between the base part and the adjustable part;
wherein the adjustable part is an upper leg support arranged in a front region of the seat part and is mounted on the base part to be displaceable in a longitudinal direction extending from the transverse supporting element to the front region;
the seat depth adjustment mechanism is a linear drive which adjusts the position of the adjustable part relative to the base part;
a longitudinal axis of the linear drive is directed toward a geometric center axis of the transverse supporting element, thereby a compressive and/or tensile force which occurs when adjusting the adjustable part is always oriented to the geometric center axis of the transverse supporting element;
when adjusting the adjustable part, the transverse supporting element does not have any rotational torques about the geometric center axis; and
the height of the upper leg support is adjusted by the height adjustment mechanism.

2. The seat part as claimed in claim 1, wherein the linear drive is a nut-spindle arrangement.

3. The seat part as claimed in claim 1, wherein the linear drive is a piston-cylinder arrangement.

4. The seat part as claimed in claim 1, wherein the linear drive is a motorized drive.

5. The seat part as claimed in claim 1, wherein the adjustable part is mounted on the base part such that it is pivotable about the transverse supporting element and wherein the transverse supporting element is part of the height adjustment mechanism.

6. The seat part as claimed in claim 1, wherein an end of the linear drive is mounted on the transverse supporting element such that it is rotatable about the transverse supporting element and wherein the transverse supporting element is part of the height adjustment mechanism.

7. The seat part as claimed in claim 1, wherein the linear drive is arranged on one side of the adjustable part, wherein a first projection of a longitudinal axis of the linear drive is congruent with a direction of travel of a vehicle and wherein a second projection of the longitudinal axis of the linear drive is congruent with a central axis of the adjustable part relative to a lateral width thereof.

\* \* \* \* \*